United States Patent
Scaramelli et al.

(10) Patent No.: US 11,629,874 B2
(45) Date of Patent: Apr. 18, 2023

(54) METHOD AND SYSTEM FOR CONTROLLING AIR QUALITY IN AN INDOOR ENVIRONMENT OF A BUILDING

(71) Applicant: FBP S.r.l., Poggio Torriana (IT)

(72) Inventors: Marco Scaramelli, Poggio Torriana (IT); Gaetano Lapenta, Poggio Torriana (IT)

(73) Assignee: FBP S.r.l., Torriana (IT)

(*) Notice: Subject to any disclaimer, the term of this patent is extended or adjusted under 35 U.S.C. 154(b) by 63 days.

(21) Appl. No.: 17/154,037

(22) Filed: Jan. 21, 2021

(65) Prior Publication Data

US 2021/0222901 A1    Jul. 22, 2021

(51) Int. Cl.
*F24F 11/30* (2018.01)
*F24F 110/70* (2018.01)

(52) U.S. Cl.
CPC .......... *F24F 11/30* (2018.01); *F24F 2110/70* (2018.01)

(58) Field of Classification Search
CPC ......... F24F 2110/50; F24F 2110/65–76; F24F 11/30; G08B 21/14; G08B 21/18; G08B 21/182
See application file for complete search history.

(56) References Cited

U.S. PATENT DOCUMENTS

| 5,464,369 A | 11/1995 | Federspiel |
| 6,369,716 B1 | 4/2002 | Abbas et al. |

(Continued)

FOREIGN PATENT DOCUMENTS

| CN | 208620480 U | 3/2019 |
| CN | 109827283 A | 5/2019 |

(Continued)

OTHER PUBLICATIONS

Search Report dated Jul. 16, 2020; App. No. 102020000001087; 10 pages.

*Primary Examiner* — Edelmira Bosques
*Assistant Examiner* — Michael James Giordano
(74) *Attorney, Agent, or Firm* — Mark E. Bandy; Rankin Hill & Clark, LLP (57) ABSTRACT

A method of controlling air quality in an indoor environment of a building is described. The method utilizes a system that comprises a carbon dioxide sensor configured to detect an instantaneous value of carbon dioxide concentration in the air of the indoor environment of the building, a control unit in signal communication with the carbon dioxide sensor, a communication unit for establishing signal communication between the carbon dioxide sensor and the control unit, and a storage unit in signal communication with the control unit. The method comprises the steps of: a) defining and storing in the storage unit, by the control unit, control values of carbon dioxide concentration; b) detecting, by the carbon dioxide sensor, an instantaneous value of carbon dioxide concentration and sending, by the communication unit, the instantaneous carbon dioxide concentration value to the control unit, c) processing, by the control unit, the control values and the instantaneous values of carbon dioxide concentration to generate an output signal representative of the processing performed by the control unit; and d) sending, by the control unit the output signal to a visual and/or acoustic warning unit.

8 Claims, 1 Drawing Sheet

(56) References Cited

U.S. PATENT DOCUMENTS

| | | | | |
|---|---|---|---|---|
| 2011/0063101 A1* | 3/2011 | Cristoforo | .............. | G08B 21/14 |
| | | | | 700/275 |
| 2015/0011154 A1* | 1/2015 | Holm | ................... | F24F 11/0001 |
| | | | | 454/258 |
| 2018/0370430 A1* | 12/2018 | Gage, III | ................ | G08B 21/12 |
| 2020/0158369 A1* | 5/2020 | Gervais | .................... | F24F 11/76 |
| 2021/0263492 A1* | 8/2021 | Kamei | ................. | G05B 19/042 |

FOREIGN PATENT DOCUMENTS

| | | |
|---|---|---|
| EP | 1 985 479 A2 | 10/2008 |
| KR | 20090084776 A | 8/2009 |
| KR | 102056452 B1 | 12/2019 |
| WO | WO2013/107461 A1 | 7/2013 |

* cited by examiner

METHOD AND SYSTEM FOR CONTROLLING AIR QUALITY IN AN INDOOR ENVIRONMENT OF A BUILDING

FIELD

The present invention relates to a method and a corresponding system for controlling air quality in an indoor environment of a building by natural ventilation.

BACKGROUND

Human breathing is known to include inhalation of oxygen from air and corresponding release of carbon dioxide to air. Thus, in overcrowded and poorly ventilated indoor environments, the level of carbon dioxide concentration might quickly increase. A high concentration of carbon dioxide in the air of the indoor environment would lead to adverse effects for humans, namely dizziness, impaired concentration and loss of performance. Also, at carbon dioxide concentration values above 800-1000 ppm, a human may already have a feeling of stale air that can significantly impair his/her activity.

A carbon dioxide sensor is known in the art to be used to measure and quantify air quality in the indoor environment. Such carbon dioxide sensor is configured to detect an instantaneous value of carbon dioxide concentration in the air of the indoor environment, i.e. to perform continuous monitoring of carbon dioxide concentration in the interior environment. Then, the instantaneous carbon dioxide concentration level is sent to a device for controlling ventilation of the indoor environment of the building, if any, to properly ventilate the indoor environment in case of an excessive increase of the carbon dioxide concentration level. The carbon dioxide concentration value is typically used to quantify the amount of carbon dioxide in the environment and if there are no systems for managing and controlling ventilation in the indoor environment, there will be no impact on air quality.

A temperature sensor is also known in the art, which is configured to detect an instantaneous temperature value of air in an indoor environment of a building. In the prior art, the measurement by the temperature sensor is only used to control the heating system of the indoor environment of the building or simply to inform the user about the temperature value.

Nevertheless, the prior art solution to control air quality in the indoor environment, with no controlled mechanical ventilation systems, does not allow notification of the instantaneous value of carbon dioxide concentration as detected by the carbon dioxide sensor to a user of the indoor environment of the building. Therefore, the user is unaware of the carbon dioxide concentration level and is thus unable to take actions to prevent the instantaneous value of carbon dioxide from exceeding values that might affect human health. Furthermore, even when the carbon dioxide level is detected and notified, the specific (and historical) concentration level in the relevant environment is never considered, as there is no way to historicize and develop optimized concentration thresholds according to the collected data.

Even when the sensor notifies instantaneous values of carbon dioxide concentration to the user, the user would not have the tools to assess what action to take to improve indoor air quality. For example, he/she would not know whether and when it would be useful to open the windows for a more or less limited period of time and has no indication of the actual impact of this carbon dioxide concentration on him/her. Therefore, the prior art does account for the history of a specific environment in order to achieve optimal natural ventilation conditions, provides no precise indication about the actions to be taken to achieve adequate air quality following deterioration and does not learn from the history of a specific environment.

SUMMARY

The difficulties and drawbacks associated with previous approaches are addressed in the present subject matter as follows.

In one aspect, the present subject matter provides a method of controlling air quality in an indoor environment of a building by a system that comprises a carbon dioxide sensor configured to detect an instantaneous value of carbon dioxide concentration in the air of the indoor environment of the building, a control unit in signal communication with the carbon dioxide sensor, a communication unit for establishing signal communication between the carbon dioxide sensor and the control unit, and a storage unit in signal communication with the control unit. The method comprises the steps of a) defining and storing in the storage unit, by the control unit, control values of carbon dioxide concentration; b) detecting, by the carbon dioxide sensor, an instantaneous value of carbon dioxide concentration and sending, by the communication unit, said instantaneous carbon dioxide concentration value to the control unit; c) processing, by the control unit, the control values and the instantaneous values of carbon dioxide concentration to generate an output signal representative of the processing performed by the control unit; and d) sending, by the control unit the output signal to a visual and/or acoustic warning unit. The method is characterized in that: the step a) comprises the steps of: a1) defining and storing in the storage unit an activation value of carbon dioxide concentration; a2) defining and storing in the storage unit a critical value of carbon dioxide concentration, said critical value of carbon dioxide concentration being greater than said activation value of carbon dioxide; and a3) defining and storing in the storage unit an acceptable value of carbon dioxide concentration, said acceptable value of concentration being smaller than the critical value of carbon dioxide concentration and greater than the activation value of carbon dioxide concentration. The method is also characterized in that the step c) comprises the step c1) of comparing the instantaneous value of carbon dioxide concentration with the activation value of carbon dioxide concentration, with the critical value of carbon dioxide concentration and with the acceptable value of carbon dioxide concentration. The output signal is representative of a first alert as long as the instantaneous value of carbon dioxide concentration is lower than the activation value of carbon dioxide concentration. The output signal is representative of a second alert as long as the instantaneous value of carbon dioxide concentration is higher than the activation value of carbon dioxide concentration and is lower than the critical value of carbon dioxide concentration. The output signal is representative of a third alert as long as the instantaneous value of carbon dioxide concentration is higher than the critical value of carbon dioxide concentration and said instantaneous value of carbon dioxide concentration remains constant or increases with time. The output signal is representative of a fourth alert once the instantaneous value of carbon dioxide concentration has exceeded the critical value of carbon dioxide concentration and as long as the instantaneous value of carbon dioxide concentration decreases with time and is higher than the acceptable value of carbon dioxide concentration.

In another aspect, the present subject matter provides a method of controlling air quality in an indoor environment of a building by a system that comprises a carbon dioxide sensor configured to detect an instantaneous value of carbon dioxide concentration in the air of the indoor environment of the building, a control unit in signal communication with the carbon dioxide sensor, a communication unit for establishing signal communication between the carbon dioxide sensor and the control unit, and a storage unit in signal communication with the control unit. The method comprises the steps of: a) defining and storing in the storage unit, by the control unit, control values of carbon dioxide concentration; b) detecting, by the carbon dioxide sensor, an instantaneous value of carbon dioxide concentration and sending, by the communication unit, said instantaneous carbon dioxide concentration value to the control unit; c) processing, by the control unit, the control values and the instantaneous values of carbon dioxide concentration to generate an output signal representative of the processing performed by the control unit; and d) sending, by the control unit the output signal to a visual and/or acoustic warning unit.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

Further features and advantages of the present invention will result more clearly from the illustrative, non-limiting description of a preferred, non-exclusive embodiment of a method and a system for controlling air quality in an indoor environment of a building as shown in the annexed drawings, in which.

DETAILED DESCRIPTION OF THE EMBODIMENTS

Here, the technical purpose of the present invention is to provide a method and a system for controlling air quality in an indoor environment of a building that can overcome the drawbacks of the prior art.

In particular, the present invention has the object to provide a method and a corresponding system that can instantaneously warn a user of the indoor environment of the building about the level of air quality and can adaptively identify the optimal natural ventilation time at that specific time, in that specific environment and under those specific conditions.

A further object of the present invention provides a method and a corresponding system that can also use the instantaneous temperature value of the indoor environment to determine the instantaneous and future air quality level.

The aforementioned technical purpose and objects are substantially fulfilled by a method for controlling air quality of an indoor environment of a building comprising the steps as set forth in one or more of the annexed claims and a corresponding system comprising the technical features as set forth in one or more of the annexed claims.

With a preferred embodiment of the invention a user may be instantaneously notified of the air quality level in the indoor environment based on the instantaneous value of carbon dioxide concentration of air inside the building.

The preferred embodiment of the invention can automatically adapt the method and system to any structure of the indoor environment of the building and to the users of this indoor environment, by predicting the behavior of the air quality values following the actions suggested by the warning devices. In other words, the method and system of the present invention are able to learn the conditions of use and deterioration of air quality, to provide adaptation to the habits of use, the size of the indoor environment, the number of windows and doors of such indoor environment, the size of these windows and doors and the specific number of users in that indoor environment at that time.

Figure 1:
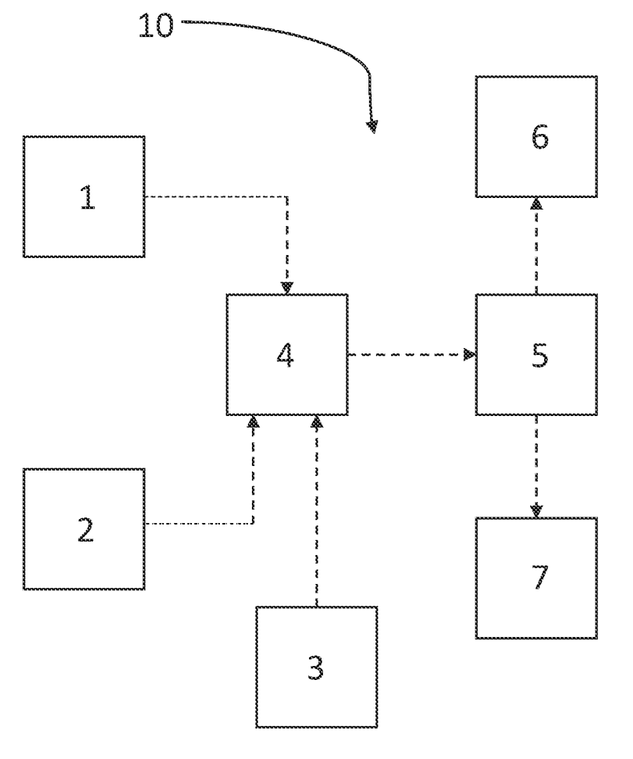
FIG. 1 is a schematic illustration of the system of the present invention.

Particularly referring to the accompanying figure, numeral 10 designates a system for controlling air quality of an indoor environment of a building. This system 10 comprises a temperature sensor 1 configured to detect an instantaneous value of temperature of air in the indoor environment of the building. In other words, the temperature sensor 1 is configured to continuously measure the temperature of the indoor environment of the building. Preferably, such temperature sensor 1 is equipped with a humidity sensor 3 configured to measure air humidity in the indoor environment.

In addition, the system 10 comprises a carbon dioxide sensor 2 configured to detect an instantaneous value of carbon dioxide concentration of air in the indoor environment of the building. In other words, the carbon dioxide sensor 2 is configured to continuously measure carbon dioxide concentration of air in the indoor environment. The carbon dioxide sensor 2 is able to perform automatic measurement calibration using a comparison chamber.

The system 10 comprises a control unit 5 in signal communication with the temperature sensor 1 and with the carbon dioxide sensor 2 and a communication unit 4 for establishing signal communication between the temperature sensor 1 and the carbon dioxide sensor 2 and the control unit 5.

Also, the system 10 comprises a storage unit 6 in signal communication with the control unit 5.

It should be noted that both the control unit 5 and the storage unit 6 may be local units, i.e. located in a device, not shown in the accompanying drawings, which also comprises the temperature sensor 1, the carbon dioxide sensor 2 and the communication unit 4. Alternatively, both the control unit 5 and the storage unit 6 may be remote units, i.e. operated in a cloud.

The present invention also relates to a method for controlling air quality in an indoor environment of a building using the system 10. A skilled person will also determine from the following description which components of the 10 system are configured to carry out the steps of the method.

The method comprises the step of a) defining and storing in the storage unit 6, by the control unit 5, control values of carbon dioxide concentration.

The method also comprises the step of b) detecting, by the carbon dioxide sensor 2, an instantaneous value of carbon dioxide concentration and sending, by the communication unit 4, such instantaneous value of carbon dioxide concentration to the control unit 5. It should be noted that the carbon dioxide sensor 2 is configured to continuously detect the carbon dioxide concentration value of the indoor environment and to continuously send this carbon dioxide concentration value to the control unit 5.

The method further comprises the step of c) processing, by the control unit 5, the control values and the instantaneous values of carbon dioxide concentration to generate an output signal representative of the processing performed by the control unit 5. In other words, the output signal generated by the control unit 5 is representative of an instantaneous level of air quality of the indoor environment. It should be noted that the control unit 5 is configured to continuously process the control values and the instantaneous values of carbon dioxide concentration to generate the output signal. This output signal may change according to the instantaneous air quality level of the indoor environment, that is, according to the instantaneous values of carbon dioxide concentration.

After the step c), the method comprises the step of d) sending, by the control unit 5, the output signal to a visual and/or acoustic warning unit 7. Preferably, such warning unit 7 is located inside the indoor environment in a position that can be easily consulted by a user of the indoor environment. The output signal generated by the control unit 5 controls the visual and/or acoustic warning unit 7. This warning unit 7 changes its warning state according to the output signal. As a result, the user of the indoor environment can infer the instantaneous air quality level in the indoor environment by checking the warning state of the warning unit 7.

In accordance with a preferred embodiment of the invention, the step a) comprises the step of a1) defining and storing a carbon dioxide concentration activation value in the storage unit 6. It should be pointed out that, if there are no people in the indoor environment at a given time, the instantaneous value of carbon dioxide concentration at that given time will be assumed to be lower than the activation value of carbon dioxide concentration.

The step a) also comprises the step of a2) defining and storing in the storage unit 6 a critical value of carbon dioxide concentration. This critical value of carbon dioxide concentration is higher than the activation value of carbon dioxide. The critical value of carbon dioxide concentration is initially equal to a value that is deemed to be appropriate for the intended use and general crowding of the indoor environment. The critical value of carbon dioxide concentration is expressed in ppm. It should be pointed out that, once the critical value of carbon dioxide concentration in the indoor environment has been exceeded, such indoor environment should be ventilated by opening, for example, a window, i.e. by a natural ventilation operation.

In addition, the step a) comprises the step of a3) defining and storing in the storage unit 6 an acceptable value of carbon dioxide concentration after reaching the critical value of carbon dioxide concentration and, therefore, after a step of improving air quality, for example as a result of natural ventilation. Such acceptable value of carbon dioxide concentration is lower than the critical value of carbon dioxide concentration and is higher than the activation value of carbon dioxide concentration. Preferably such acceptable value of carbon dioxide concentration is initially equal to a value that is deemed to be appropriate in the specific geographic and environmental condition and considering the intended use and typical crowding of the indoor environment. This acceptable value of carbon dioxide concentration is expressed in ppm. It should be pointed out that, once the acceptable value of carbon dioxide concentration in the indoor environment has been reached during ventilation of the indoor environment, it is no longer needed to ventilate this indoor environment and it is therefore possible, for example, to close the window (such action being indicated by color restoration/activation indication).

It should be noted that, should carbon dioxide concentration values undergo abrupt changes, i.e. with the critical value of carbon dioxide concentration being repeatedly reached, and later decreased to the acceptable value of carbon dioxide concentration, than continuous and repeated action by the user should be required (opening/closing the window) which would be inconvenient during operation. This will require the definition of thresholds that also account for this latency time.

Still according to the preferred embodiment of the invention, the step c) comprises the step of c1) comparing the instantaneous value of carbon dioxide concentration with the activation value of carbon dioxide concentration, with the critical value of carbon dioxide concentration and with the acceptable value of carbon dioxide concentration.

The output signal is representative of a first alert as long as the instantaneous value of carbon dioxide concentration is lower than the activation value of carbon dioxide concentration. The first alert is representative of a first level of air quality in the indoor environment. As long as the output signal is representative of the first level of air quality in the indoor environment, no one is assumed to be present in the indoor environment.

The output signal is representative of a second alert as long as the instantaneous value of carbon dioxide concentration is higher than the activation value of carbon dioxide concentration and is lower than the critical value of carbon dioxide concentration. Such second alert is representative of a second level of air quality in the indoor environment. If the output signal is representative of the second air quality level, there will be no need to ventilate the indoor environment.

The output signal is representative of a third alert as long as the instantaneous value of carbon dioxide concentration is higher than the critical carbon dioxide concentration and the instantaneous value of carbon dioxide concentration remains constant or increases with time. Such third alert is representative of a third air quality level in the indoor environment. If the output signal is representative of the third air quality level, then the user of the indoor environment will know that the indoor environment shall have to be ventilated, for example by opening a window.

The output signal is representative of a fourth alert once the instantaneous value of carbon dioxide concentration has exceeded the critical value of carbon dioxide concentration and as long as the instantaneous value of carbon dioxide concentration decreases with time and is higher than the acceptable value of carbon dioxide concentration. Such fourth alert is representative of a fourth air quality level in the indoor environment. If the output signal is representative of the fourth alert, this will mean that the user is ventilating the indoor environment, for example by opening a window, that is, the air quality of the indoor environment is improving. Moreover, as long as the output signal is representative of the fourth air quality level, the user will understand that the indoor environment must still be ventilated. Accordingly, the user will be able to understand for how long the indoor environment will have to be ventilated under those specific conditions, i.e. at that time, with that number of people in the indoor environment and those specific conditions of use.

After a ventilation step, i.e. when the instantaneous value of carbon dioxide concentration drops below the acceptable value of carbon dioxide concentration and remains higher than the activation value of carbon dioxide, the output signal becomes once again representative of the second alert.

Therefore, it should therefore be pointed out that the period of time during which the indoor environment must be ventilated is the period of time that elapses between the time point at which the output signal is representative of the fourth alert and the time point at which the output signal becomes once again representative of the second alert.

It should also be noted that the output signal is configured to carry the first, second, third and fourth alerts, respectively.

According to the preferred embodiment of the invention, the method comprises, after step b) and before step c), the step of detecting, by the temperature sensor 1, an instantaneous temperature value of air in the indoor environment and sending, by the communication unit 4, this instantaneous temperature value to the control unit 5. It should be noted that the temperature sensor 1 is configured to continuously detect the temperature value of air in the indoor environment and to continuously send this temperature value to the control unit 5.

Again after step b) and before step c), the method comprises the step of defining, by the control unit 5, a refresh time interval comprising a plurality of time points. Preferably, this refresh time interval corresponds to the time period between two successive ventilations of the indoor environment of the building.

Still after step b) and before step c), the method comprises the step of storing in the storage unit 6, by the control unit 5, an instantaneous value of temperature for each time point of the refresh time interval to define a set of instantaneous values of temperature.

Still after step b) and before step c), the method comprises the step of storing in the storage unit 6, by the control unit 5, an instantaneous value of carbon dioxide concentration for each time point of the refresh time interval to define a set of instantaneous values of carbon dioxide concentration.

According to the preferred embodiment, the method comprises, after step b) and before step c), the step of defining, by the control unit 5, a temperature reference value. Preferably, this temperature reference value is equal to 18° C.

Still after step b) and before step c), the method comprises the step of analyzing, by the control unit 5, the set of instantaneous values of temperature to define a maximum temperature value between said instantaneous values of temperature and the step of analyzing, by the control unit 5, the set of instantaneous values of temperature to define a rate of decrease of temperature.

Still after step b) and before step c), the method comprises the step of defining, by the control unit 5, a maximum air purification time interval according to the maximum value of temperature, the reference value of temperature and the rate of decrease of temperature. The maximum purification time interval represents a maximum ventilation time for the indoor environment to avoid a decrease below the temperature reference value. Preferably, the first maximum air purification time interval is defined by the control unit 5 in accordance with the following expression:

$$t\text{max[min]} = \frac{T\text{max} - T\text{ref}}{vT^-}$$

Where:
tmax: maximum air purification time interval;
Tmax: Maximum temperature value;
TREF: Temperature reference value;
$VT^-$=temperature decrease rate.

Still according to the preferred embodiment of the invention, the step c) comprises the step of c2) defining, by the control unit 5, a critical time interval corresponding to the period of time in which the output signal is representative of the fourth alert. In other words, the critical time interval corresponds to the time period in which the indoor environment must be ventilated.

In addition, the step c) comprises the step of c3) comparing, by the control unit 5, the critical time interval with the maximum air purification time interval.

The step c) also comprises the step of c4) setting the output signal to the second alert if the critical time interval exceeds the maximum air purification time interval. In other words, regardless of the result of the comparison between the instantaneous value of carbon dioxide concentration and the critical and acceptable values of carbon dioxide concentration, if the critical time interval exceeds the maximum air purification time interval, then the output signal will carry the second alert, i.e. the indoor environment no longer needs to be ventilated.

According to the preferred embodiment of the invention, the method comprises, after step b) and before step c), the step of defining, by the control unit 5, a reference time interval and a comfort value of carbon dioxide concentration of air in the indoor environment of the building. This reference time interval represents a minimum time interval that must elapse for ventilation of the indoor environment. It should be noted that this reference time interval is set as an initial value at 10 min, but that this value may vary depending on the customer, the season and the specific conditions of the indoor environment. The comfort value of carbon dioxide concentration represents a carbon dioxide concentration value of the indoor ambient that does not affect the performance and concentration of a user of the indoor environment.

In addition, after step b) and before step c), the method also comprises the step of analyzing, by the control unit 5, the set of instantaneous values of carbon dioxide concentration to determine a rate of increase of carbon dioxide concentration.

Still after step b) and before step c), the method comprises the step of calculating, by the control unit 5, an actual time interval according to the critical value of carbon dioxide concentration, the acceptable value of carbon dioxide concentration and the rate of increase of carbon dioxide concentration. Preferably, the actual time interval is calculated by the control unit according to the following expression:

$$t blu\text{max[min]} = \frac{Va - Vc}{vCO2^+}$$

Where:
tblumax [min]: actual time interval;
Va: critical value of carbon dioxide concentration;
Vc: acceptable value of carbon dioxide concentration;
$vCO2^+$=rate of increase of carbon dioxide concentration.

It should be noted that if the rate of increase of carbon dioxide concentration is zero, this effective time interval is set by the control unit 5, to a high value such as, for example, 30 min.

After the step of calculating the actual time interval, the method comprises the step of comparing, by the control unit 5, the actual time interval with the reference time interval.

After the step of comparing the actual time interval with the reference time interval, the method comprises the step of refreshing, by the control unit 5, the acceptable value of carbon dioxide concentration according to the comfort value of carbon dioxide concentration, the reference time interval, the actual time interval and the rate of increase of carbon dioxide concentration, if the actual time interval is shorter than the reference time interval. Preferably, the acceptable value of carbon dioxide concentration is refreshed by the control unit 5 according to the following expression:

$$Vcnew = CO2c - \frac{tref - tblumax}{vCO2^+}$$

Where:
Vcnew: acceptable value of carbon dioxide concentration after refreshing by the control unit 5;
CO2c: comfort value of carbon dioxide concentration;
tref: reference time interval;
tblumax: actual time interval;
$vCO2^+$: rate of increase of carbon dioxide concentration.

The acceptable value of carbon dioxide concentration after refreshing is stored in the storage unit 6 instead of the previous acceptable value of carbon dioxide concentration.

On the other hand, if the actual time interval is longer than or equal to the reference time interval, the acceptable value of carbon dioxide concentration is not refreshed by the control unit 5, which means that it remains equal to the acceptable value of carbon dioxide concentration stored in the storage unit 6.

According to the preferred embodiment of the invention, the method comprises, after the step of refreshing the acceptable value of carbon dioxide concentration and before step c), the step of defining, by the control unit 5, a value of carbon dioxide concentration outside the building. Preferably, this value of carbon dioxide concentration is measured by means of a carbon dioxide concentration detecting device located outside the building.

After the step of defining an outside value of carbon dioxide concentration, the method comprises the step of comparing, by the control unit 5, the acceptable value of carbon dioxide concentration with the outside value of carbon dioxide concentration.

After the step of comparing, by the control unit 5, the acceptable value of carbon dioxide concentration with the outside value of carbon dioxide concentration, the method comprises the step of refreshing, by the control unit 5, the acceptable value of carbon dioxide concentration according to the outside value of carbon dioxide concentration, if the acceptable value of carbon dioxide concentration exceeds the outside value of carbon dioxide concentration by a value that is equal to a specific value of carbon dioxide concentration, preferably equal to 200 ppm. Preferably, the acceptable value of carbon dioxide concentration is refreshed by the control unit 5 according to the following expression:

$$Vcnew = Ve + 200$$

Where:
Vcnew: acceptable value of carbon dioxide concentration after refreshing by the control unit 5;
Ve: outside value of carbon dioxide concentration;

Still after the step of comparing, by the control unit 5, the acceptable value of carbon dioxide concentration with the outside value of carbon dioxide concentration, the method comprises the step of refreshing, by the control unit 5 the critical value of carbon dioxide concentration according to the critical value of carbon dioxide concentration stored in the storage unit 6, the reference time interval, the outside value of carbon dioxide concentration and the rate of increase of carbon dioxide concentration, if the acceptable value of carbon dioxide concentration exceeds the outside value of carbon dioxide concentration by a value that is equal to the specific value of carbon dioxide concentration. Preferably, the critical value of carbon dioxide concentration is refreshed by the control unit 5 according to the following expression:

$$Vanew = Va + \frac{tref - (Va - (Ve + 200))}{vCO2^+}$$

Where:
Vanew: critical value of carbon dioxide concentration after refreshing by the control unit 5;
tref: reference time interval;
Va: Critical value of carbon dioxide concentration stored in the memory unit 6;
Ve: Outside value of carbon dioxide concentration;
$vCO2^+$: rate of increase of carbon dioxide concentration.

The acceptable value of carbon dioxide concentration and the critical value of carbon dioxide concentration after refreshing are stored in the storage unit 6 instead of the previous acceptable value of carbon dioxide concentration and the previous critical value of carbon dioxide concentration, respectively.

On the other hand, if the acceptable value of carbon dioxide concentration does not exceed the outside value of carbon dioxide concentration by a value equal to the specific value of carbon dioxide concentration, the acceptable value of carbon dioxide concentration and the critical value of carbon dioxide concentration are not refreshed by the control unit, i.e. they remain equal to the acceptable value of carbon dioxide concentration and the critical value of carbon dioxide concentration stored in the storage unit 6, respectively.

According to the preferred embodiment of the invention, the method comprises, after the step of updating the acceptable and critical values of carbon dioxide concentration and before step c), the additional step of defining, by the control unit 5, an air purification time interval as a function of the critical value of carbon dioxide concentration, the acceptable value of carbon dioxide concentration and the rate of decrease of carbon dioxide concentration. This air purification time interval represents the period of time required to ventilate the indoor environment considering the acceptable value and the critical value of carbon dioxide concentration as refreshed by the control unit 5. Preferably, the air purification time interval is defined by the control unit 5 according to the following expression:

$$ta = \frac{Vanew - Vcnew}{vCO2^-}$$

Where:
ta: air purification time interval;
Vanew: Critical value of carbon dioxide concentration after refreshing by the control unit 5;
Vcnew=acceptable value of carbon dioxide concentration following updating by the control unit 5;

VCO2⁻=rate of decrease of carbon dioxide concentration.

After the step of defining, by the control unit 5, an air purification time interval, the method comprises the step of defining, by the control unit 5, a minimum attainable temperature value as a function of the maximum temperature value, the purification time interval and the rate of temperature decrease. Preferably, the minimum attainable temperature value is defined by the control unit 5 according to the following expression:

$$Tmin periodo = Tmax - (ta * vT-)$$

Where:
Tmin period=minimum attainable temperature value;
Tmax=maximum temperature value of the set of instantaneous temperature values;
ta=air purification time interval;
vT⁻=temperature decrease rate.

After the step of defining, by the control unit 5, a minimum attainable temperature value, the method comprises the step of comparing, by the control unit 5, the minimum attainable temperature value with the reference temperature value.

After the step of comparing, by the control unit 5, the minimum attainable temperature value with the reference temperature value, the method comprises the step of refreshing, by the control unit 5, the acceptable value of carbon dioxide concentration according to the critical value of carbon dioxide concentration, the air purification time interval and the rate of decrease of carbon dioxide concentration, if the minimum attainable value of temperature is smaller than the reference value of temperature. Preferably, the acceptable value of carbon dioxide concentration is refreshed by the control unit 5 according to the following expression:

$$Vcnew = Vanew - (ta - 1) * vCO2^-$$

Where:
Vcnew: acceptable value of carbon dioxide concentration after refreshing by the control unit 5;
Vanew: critical value of carbon dioxide concentration;
ta: air purification time interval;
vCO2⁻: rate of decrease of carbon dioxide concentration.

The acceptable value of carbon dioxide concentration after refreshing is stored in the storage unit 6 instead of the previous acceptable value of carbon dioxide concentration stored in the storage unit 6.

On the other hand, if the minimum attainable temperature value is higher than or equal to the temperature reference value, the acceptable carbon dioxide concentration value will not be refreshed and will remain equal to the acceptable carbon dioxide concentration value as stored in the storage unit 6.

It should be pointed out that, by refreshing the acceptable and critical values of carbon dioxide concentration according to the detected instantaneous values of temperature and carbon dioxide concentration, no preliminary calibration step according to the specific characteristics of the indoor environment will be needed. In other words, the method does not require a calibration step based on the dimensional parameters of the indoor environment, the number and size of ventilation sources (doors and windows) and the number of people in this indoor environment. In short, by refreshing the acceptable and critical values of carbon dioxide concentration, irrespective of the specific characteristics of the indoor environment, users can be notified of the air quality level in the indoor environment, whether the indoor environment needs ventilation, and for how long such indoor environment must be ventilated, with an additional real-time indication of the actual effectiveness of the ventilation applied. This complies with the principles of comfort and energy efficiency.

According to a first embodiment of the invention, step d) comprises a step of d1) sending the output signal from the control unit (5) to a light source. The first, second, third and fourth alerts correspond to a first, a second, a third and a fourth light colors and/or intensities that can be emitted by the light source. For example, the first alert corresponds to a white color, the second alert corresponds to a cyan color, the third alert corresponds to a red color, and the fourth alert corresponds to a magenta color, preferably a flashing magenta color. Therefore, it should be pointed out that, by controlling the light color emitted by the light source, the user is able to immediately check the air quality of the indoor environment. Thus, according to what has been introduced above, if the color emitted by the light source is white or cyan, the user will understand that the indoor environment does not need to be ventilated, whereas if the color emitted by the source is red, the user will understand that the indoor environment must be ventilated, and, as long as the magenta light is flashing, he/she will perceive for how long the indoor environment must be ventilated until the cyan color is restored.

According to a second embodiment, which may be provided instead of or in combination with the first embodiment of the invention, step d) comprises a step of d2) sending the output signal from the control unit 5 to a sound source. The first, second, third and fourth alerts correspond to first, second, third and fourth sound tones and/or intensities, respectively.

Preferably, the output signal that carries the second alert is sent to the sound source upon transition from the first to the second alerts and/or upon transition from the fourth to the second alerts.

Preferably, the output signal that carries the third alert is sent to the sound source upon transition from the second to the third alerts.

Preferably, the output signal that carries the fourth alert is sent to the sound source upon transition from the third to the fourth alerts.

Preferably, the output signal that carries the first alert is sent to the sound source upon transition from the second alert to the first alert.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method of controlling air quality in an indoor environment of a building by a system that comprises a carbon dioxide sensor configured to detect an instantaneous value of carbon dioxide concentration in the air of the indoor environment of the building, a control unit in signal communication with the carbon dioxide sensor, a communication unit for establishing signal communication between the carbon dioxide sensor and the control unit, and a storage unit in signal communication with the control unit, the method comprising the steps of:
   a) defining and storing in the storage unit, by the control unit, control values of carbon dioxide concentration;
   b) detecting, by the carbon dioxide sensor, an instantaneous value of carbon dioxide concentration and sending, by the communication unit, said instantaneous carbon dioxide concentration value to the control unit;
   c) processing, by the control unit, the control values and the instantaneous values of carbon dioxide concentration to generate an output signal representative of the processing performed by the control unit;
   d) sending, by the control unit the output signal to a visual and/or acoustic warning unit;
   said method being characterized in that:
   the step a) comprises the steps of:
      a1) defining and storing in the storage unit an activation value of carbon dioxide concentration;
      a2) defining and storing in the storage unit a critical value of carbon dioxide concentration, said critical value of carbon dioxide concentration being greater than said activation value of carbon dioxide;
      a3) defining and storing in the storage unit an acceptable value of carbon dioxide concentration, said acceptable value of concentration being smaller than the critical value of carbon dioxide concentration and greater than the activation value of carbon dioxide concentration;
   the step c) comprises the step c1) of comparing the instantaneous value of carbon dioxide concentration with the activation value of carbon dioxide concentration, with the critical value of carbon dioxide concentration and with the acceptable value of carbon dioxide concentration; wherein
      the output signal is representative of a first alert in which the instantaneous value of carbon dioxide concentration is lower than the activation value of carbon dioxide concentration;
      the output signal is representative of a second alert in which the instantaneous value of carbon dioxide concentration is higher than the activation value of carbon dioxide concentration and is lower than the critical value of carbon dioxide concentration;
      the output signal is representative of a third alert in which the instantaneous value of carbon dioxide concentration is higher than the critical value of carbon dioxide concentration and said instantaneous value of carbon dioxide concentration remains constant or increases with time;
      the output signal is representative of a fourth alert once the instantaneous value of carbon dioxide concentration has exceeded the critical value of carbon dioxide concentration and in which the instantaneous value of carbon dioxide concentration decreases with time and is higher than the acceptable value of carbon dioxide concentration.

2. A method as claimed in claim 1 wherein the system further comprises a temperature sensor configured to detect an instantaneous value of air temperature in the indoor environment, said temperature sensor being in signal communication with the control unit via the communication unit, said method comprising, after the step b) and before the step c), the steps of:
   detecting, by the temperature sensor, an instantaneous value of air temperature in the indoor environment and sending, by the communication unit said instantaneous value of temperature to the control unit;
   defining, by the control unit, a refresh time interval comprising a plurality of time points;
   storing in the storage unit, by the control unit, an instantaneous value of temperature for each time point of the refresh time interval to define a set of instantaneous values of temperature;
   storing in the storage unit, by the control unit, an instantaneous value of carbon dioxide concentration for each time point of the refresh time interval to define a set of instantaneous values of carbon dioxide concentration.

3. A method of controlling air quality in an indoor environment of a building by a system that comprises a carbon dioxide sensor configured to detect an instantaneous value of carbon dioxide concentration in the air of the indoor environment of the building, a control unit in signal communication with the carbon dioxide sensor, a communication unit for establishing signal communication between the carbon dioxide sensor and the control unit, and a storage unit in signal communication with the control unit, the method comprising the steps of:
   a) defining and storing in the storage unit, by the control unit, control values of carbon dioxide concentration;
   b) detecting, by the carbon dioxide sensor, an instantaneous value of carbon dioxide concentration and sending, by the communication unit, said instantaneous carbon dioxide concentration value to the control unit;
   c) processing, by the control unit, the control values and the instantaneous values of carbon dioxide concentration to generate an output signal representative of the processing performed by the control unit;
   d) sending, by the control unit the output signal to a visual and/or acoustic warning unit;
   said method being characterized in that:
   the step a) comprises the steps of:
      a1) defining and storing in the storage unit an activation value of carbon dioxide concentration;
      a2) defining and storing in the storage unit a critical value of carbon dioxide concentration, said critical value of carbon dioxide concentration being greater than said activation value of carbon dioxide;
      a3) defining and storing in the storage unit an acceptable value of carbon dioxide concentration, said acceptable value of concentration being smaller than the critical value of carbon dioxide concentration and greater than the activation value of carbon dioxide concentration;
   the step c) comprises the step c1) of comparing the instantaneous value of carbon dioxide concentration with the activation value of carbon dioxide concentration, with the critical value of carbon dioxide concentration and with the acceptable value of carbon dioxide concentration; wherein the output signal is representative of a first alert as long as the instantaneous value of carbon dioxide concentration is lower than the activation value of carbon dioxide concentration;

the output signal is representative of a second alert as long as the instantaneous value of carbon dioxide concentration is higher than the activation value of carbon dioxide concentration and is lower than the critical value of carbon dioxide concentration;

the output signal is representative of a third alert as long as the instantaneous value of carbon dioxide concentration is higher than the critical value of carbon dioxide concentration and said instantaneous value of carbon dioxide concentration remains constant or increases with time;

the output signal is representative of a fourth alert once the instantaneous value of carbon dioxide concentration has exceeded the critical value of carbon dioxide concentration and as long as the instantaneous value of carbon dioxide concentration decreases with time and is higher than the acceptable value of carbon dioxide concentration;

wherein the system further comprises a temperature sensor configured to detect an instantaneous value of air temperature in the indoor environment, said temperature sensor being in signal communication with the control unit via the communication unit, said method comprising, after the step b) and before the step c), the steps of:

detecting, by the temperature sensor, an instantaneous value of air temperature in the indoor environment and sending, by the communication unit said instantaneous value of temperature to the control unit;

defining, by the control unit, a refresh time interval comprising a plurality of time points;

storing in the storage unit, by the control unit, an instantaneous value of temperature for each time point of the refresh time interval to define a set of instantaneous values of temperature;

storing in the storage unit, by the control unit, an instantaneous value of carbon dioxide concentration for each time point of the refresh time interval to define a set of instantaneous values of carbon dioxide concentration;

after the step b) and before the step c), the steps of:

defining, by the control unit, a reference value of temperature;

analyzing, by the control unit, the set of instantaneous values of temperature to determine a maximum value of temperature from said instantaneous values of temperature;

analyzing, by the control unit, the set of instantaneous values of temperature to determine a rate of decrease of temperature;

defining, by the control unit, a maximum air purification time interval according to the maximum value of temperature, the reference value of temperature and the rate of decrease of temperature;

the step c) comprises the steps of:

c2) defining, by the control unit, a critical time interval corresponding to the period of time in which the output signal is representative of the fourth alert;

c3) comparing, by the control unit, the critical time interval with the maximum air purification time interval;

c4) setting the output signal to the second alert if the critical time interval exceeds the maximum air purification time interval.

4. A method as claimed in claim 3 comprising, after the step b) and before the step c), the steps of:

defining, by the control unit, a reference time interval and a comfort value of carbon dioxide concentration in the air of the indoor environment of the building;

analyzing, by the control unit, the set of instantaneous values of carbon dioxide concentration to determine a rate of increase of carbon dioxide concentration;

calculating, by the control unit, an actual time interval according to the critical value of carbon dioxide concentration, the acceptable value of carbon dioxide concentration and the rate of increase of carbon dioxide concentration;

comparing, by the control unit, the actual time interval with the reference time interval;

refreshing, by the control unit, the acceptable value of carbon dioxide concentration according to the comfort value of carbon dioxide concentration, the reference time interval, the actual time interval and the rate of increase of carbon dioxide concentration if the actual time interval is shorter than the reference time interval.

5. A method as claimed in claim 4, comprising, after the step of refreshing the acceptable value of carbon dioxide concentration and before the step c):

defining, by the control unit, a value of carbon dioxide concentration outside the building;

comparing, by the control unit, the acceptable value of carbon dioxide concentration with the outside value of carbon dioxide concentration;

refreshing, by the control unit, the acceptable value of carbon dioxide concentration according to the outside value of carbon dioxide concentration and refreshing, by the control unit, the critical value of carbon dioxide concentration according to the critical value of carbon dioxide concentration stored in the storage unit, the reference time interval, the outside value of carbon dioxide concentration and the rate of increase of carbon dioxide concentration, if the acceptable value of carbon dioxide concentration exceeds the outside value of carbon dioxide concentration by a value that is equal to a specific value of carbon dioxide concentration, preferably equal to 200 ppm.

6. A method as claimed in claim 5, comprising, after the step of refreshing the acceptable and critical values of carbon dioxide concentration and before the step c), the additional steps of:

defining, by the control unit, an air purification time interval according to the critical value of carbon dioxide concentration, the acceptable value of carbon dioxide concentration and the rate of decrease of carbon dioxide concentration;

defining, by the control unit, a minimum attainable value of temperature according to the maximum value of temperature, the purification time interval and the rate of decrease of temperature;

comparing, by the control unit, the minimum attainable value of temperature with the reference value of temperature;

refreshing, by the control unit, the acceptable value of carbon dioxide concentration according to the critical value of carbon dioxide concentration, the air purification time interval and the rate of decrease of carbon dioxide concentration, if the minimum attainable value of temperature is smaller than the reference value of temperature.

7. A method as claimed in claim 1, wherein the step d) comprises the step d1) of sending the output signal from the control unit to a light source, the first, second, third and fourth alerts corresponding to a first, a second, a third and a fourth light colors and/or intensities that can be emitted from the light source respectively.

8. A method as claimed in claim 1, wherein the step d) comprises the step d2) of sending the output signal from the control unit to a sound source, the first, second, third and fourth alerts corresponding to a first, a second, a third and a fourth sound tones and/or intensities respectively.

* * * * *